Aug. 4, 1959     H. P. MINNICK     2,898,446
WELDING-ROD HOLDER
Filed March 6, 1958

INVENTOR.
HOWARD P. MINNICK
BY Robertson and Yantie
ATTORNEYS.

United States Patent Office 2,898,446
Patented Aug. 4, 1959

2,898,446

WELDING-ROD HOLDER

Howard P. Minnick, Norristown, Pa.

Application March 6, 1958, Serial No. 719,533

2 Claims. (Cl. 219—138)

This invention relates generally to improvements in welding tools, and is especially concerned with certain novel and advantageous structural features in welding-rod holders.

As is well known to those versed in the art of electric welding, conventional welding-rod holders are not entirely satisfactory for many reasons, primarily in that they conduct excessive quantities of heat to the operator's hand, and also in that excess quantities of heat are radiated in the general working area, so that an operator becomes unduly oppressed and fatigued, resulting in lowered production output. More specifically, commonly employed welding-rod holders include the electrical-supply cable or conductor in the hand-grip portion of the holder, so that both radiant and conducted heat are transmitted to the operator's hand, in addition to making the handle excessively bulky and awkward to grasp for sustained periods of time. Further, prior welding-rod holders were, by the nature of their construction, necessarily fabricated for the most part of metal and similar highly conductive materials, so that the heat produced in the operation could not be easily conducted away from the immediate working area.

It is therefore one object of the present invention to provide a holder for welding rods which overcomes the above-mentioned difficulties, effectively insulates and isolates the operator's hand from excessive heat, enabling the holder to be made in a size and shape more easily grasped, which is adapted to be manufactured of materials having high heat-insulating characteristics, and which is provided with effective means for dissipating heat from the handle.

It is a further object of the present invention to provide a welding-rod holder of the type described wherein welding rods are more quickly and easily inserted and withdrawn, and with positive and reliable electrical connections throughout.

It is a further object of the present invention to provide a welding-rod holder having the advantageous characteristics mentioned in the preceding paragraphs, which is extremely simple in construction, durable and long-lasting in use, and which can be manufactured and sold at a reasonable cost.

Other objects of the present invention will become apparent upon reading the following specification and referring to the accompanying drawings, which form a material part of this disclosure.

The invention accordingly consists in the features of construction, combination of elements, and arrangements of parts, which will be exemplified in the construction hereinafter described, and of which the scope will be indicated by the appended claims.

Figure 2:
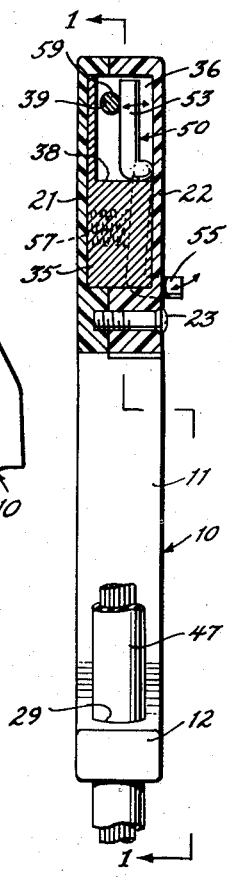
Figure 2 is a longitudinal sectional view taken substantially along the line 2—2 of Figure 1.
Figure 1:
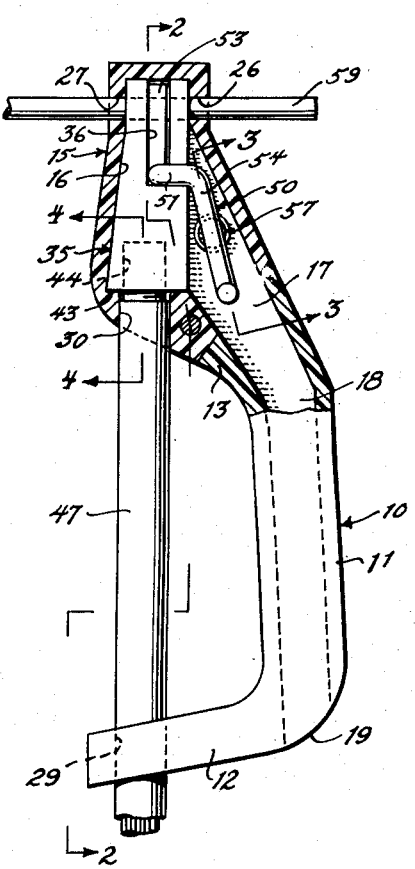
Figure 1 is a longitudinal view showing a welding-rod holder of the present invention having a welding rod held therein, and partly in section, as taken along the line 1—1 of Figure 2.

Referring now more particularly to the drawings, and specifically to Figures 1 and 2 thereof, there is illustrated therein a handle 10 of approximately C-shape having an intermediate or bight portion 11, and end or leg portions 12 and 13. The handle 10 is generally flat or coplanar, as best seen in Figure 2; and, projecting outward from the distal end of leg portion 13, substantially coplanar with the remainder of the C-shaped handle 10, is an extension 15. That is, the extension 15 extends from the distal end of leg 13 in the direction away from the leg 12.

As best seen in Figure 1, the extension 15 is generally hollow, as at 16, and communicates or opens into an interior hollow or passageway 17 in the leg 13, which in turn opens into an interior hollow or passageway 18 in the intermediate or bight portion 11 of the handle. The interior hollow or passageway 18 extends entirely through the intermediate handle portion 11 and opens therefrom at 19, adjacent to the leg 12.

The handle 10 and its extension 15 may be fabricated of plastic, or other preferably heat-insulating material, and is advantageously molded having one part 21 of the extension 15 integral with the leg 13 (see Figure 2). The other side or part 22 of the extension 15 may be a separate piece removably fixed in complementary or closing relation with respect to the integral side 21, as by a fastener 23.

Figure 6:
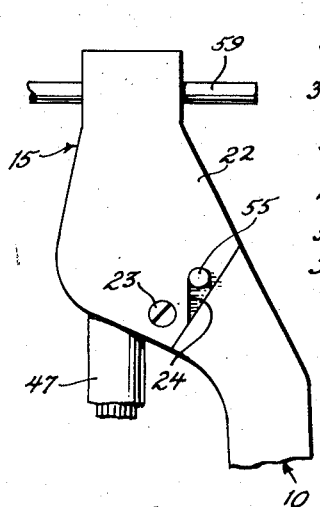
Figure 6 is a partial view similar to Figure 1, but in elevation.
Figure 3:
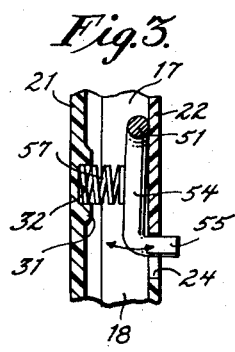
Figure 3 is a partial sectional view taken substantially along the line 3—3 of Figure 1.

In Figures 3 and 6, it will be observed that the removable-extension side or part 22 is formed with an elongate through opening or cutout 24, for a purpose appearing hereinafter. Also, the distal end region of the extension 15 is provided in opposite wall portions with a pair of transversely extending, aligned through apertures or bores 26 and 27, which preferably have their axis of alignment generally coplanar with the handle 10, and transverse of the intermediate or hand-grip portion 11 of the handle.

Formed in the leg 12 of handle 10 is a through bore or hole 29, extending in substantially coplanar relation with respect to the handle, opening at one end outwardly from the handle and at its other end generally toward the opposite leg 13. In addition, the leg 13 is provided on its inner side with a bore or hole 30 in substantial alignment with and facing toward the hole 29. The hole 30 of leg 13 opens into the interior hollow 16 of the extension 15. As best seen in Figure 1, the axis of alignment of holes 29 and 30 is generally parallel to and spaced remote from the intermediate or grip portion 11 of the handle 10. In Figure 3 it is best seen that the internal surface of the integral extension part 21 may be provided with a generally annular wall 31 defining therewithin a generally circular seat 32 peripherally bounded by the latter wall and facing toward the extension part 22.

Figure 5:
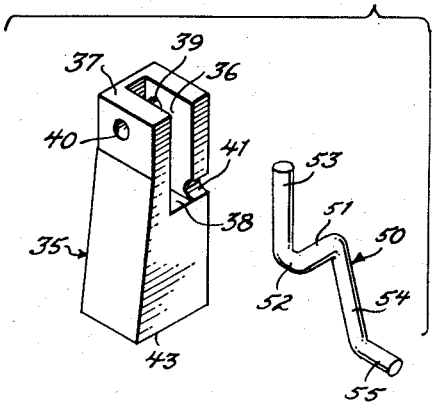
Figure 5 is an exploded perspective view showing the connector block and the clamping members of the instant welding-rod holder apart from the remainder thereof.

Snugly and conformably received in the extension 15, arranged longitudinally thereof, is an elongate connector element or block 35. As best seen in Figures 2 and 5, the connector element or block 35, which is preferably fabricated of highly conductive material, such as aluminum or the like, is formed with a generally rectangular cutout or recess 36 extending inwardly from the outer connector end 37 and terminating in an internal end wall 38 located in spaced relation between opposite ends of the connector. Further, the cutout or recess 36 of the connector 35 opens through the side wall of the connector adjacent to and facing toward the removable-extension part or cover 22. Extending transversely through the outer end region of the connector 35, in substantial alignment with each other, are a pair of through openings or bores 39 and 40, which bores are on opposite sides of and open into the cutout 36 and are in registry with the extension openings or bores 26 and 27. In addition, a groove 41 is formed in the connector block 35 adjacent to the cutout end wall 38 extending from the cutout to open into the internal hollow or passageway portion 17 of the leg 13. The groove 41 is preferably of approximately semicircular cross-sectional configuration, having its opposite ends open, and faces toward the side part or cover 22. It will now be appreciated that the groove 41 extends in a direction generally parallel to that of the axis of bores 39 and 40.

Figure 4:
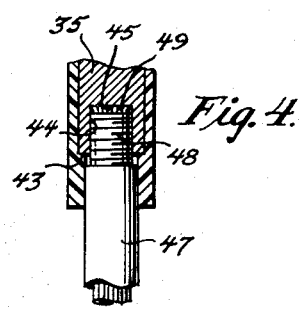
Figure 4 is a partial sectional view taken substantially along the line 4—4 of Figure 1.

As best seen in Figures 1 and 4, the inner end 43 of the connector block 35 is located proximate to the bore 30 of leg 13; and further, the connector block is provided with a hole 44 extending inward from the connector-block end 43 in substantial alignment with the leg hole 30. The end hole 44 of the connector block 35 terminates in an end wall 45 spaced from the end wall 38 of recess 36, and the hole 44 is advantageously internally threaded, for a purpose appearing presently.

An electrical-supply conductor or cable 47 extends from the source of electrical supply (not shown) through the hole or bore 29 of handle leg 12, and into the opening or hole 30 of handle leg 13. The conductor or cable 47 is, of course, insulated, and has its end received in the connector-block hole 44, see Figure 4. The thus-received end of cable 47 may be provided with an externally threaded conductive tube or ring 48 snugly circumposed about the wires of cable 47 and in threaded engagement within the hole 45 of the connector block. By this construction, the ends of the cable wires, as at 49, are caused to maintain firm and positive electrical connections with the end wall 45 of connector-block hole 44. It will now be appreciated that the electrical-supply cable 47 is supported by the handle 10 extending between the legs thereof in spaced relation with respect to the hand-grip portion 11.

A clamping member is best seen in Figure 5, there designated 50, and illustrated as a generally elongate member which may be fabricated of wire or rod stock bent to a suitable configuration. More specifically, the clamping member 50 may include a generally transverse medial portion 51 adapted to rotatably seat in the groove 41 of connector block 45 extending beyond opposite ends thereof into the connector-block recess 36 and the interior hollow of the extension 15. From the transverse intermediate portion 51 of the clamping member 50, interiorly of the recess 36, a clamping-member portion 52 extends generally normal to the rotatably seated or journaled intermediate portion away from the cover part 22 into the recess 36. From the portion 52, generally normal thereto, extends an end portion 53 in the recess 36 toward and terminating short of the distal or outer end wall of the extension 15. As best seen in Figure 2, the end portion 53 of clamping member 50 extends beyond the axis of bores 39 and 40. Exteriorly of the connector block 35, generally normal to and extending from the other end of the intermediate clamping-member portion 51, a clamping-member portion 54 extends generally longitudinally within the passageway 17, and has its terminal portion 55 bent to project outward through the cutout or opening 24. It will now be understood that the above-mentioned journaled support of the medial clamping-member region 51 in groove 41 mounts the clamping member for opposite swinging movement of its end portions 53 and 55 in the direction of the arrows in Figure 2. More specifically, the end portion 55 defines a push button for manual actuation, as by the thumb of an operator, while the opposite end portion 53 is swingable into and out of a position at least partially crossing the bores of holes 39 and 40.

Suitable resilient means, such as a coil compression spring 57, may be employed to urge the clamping member in one direction of its swinging movement. As illustrated, the coil compression spring 57 has one end received in the seat 32, see Figure 3, and its other end in bearing engagement with the clamping-member portion 54 to urge the latter toward the removable part or cover 22 of the extension 15.

In operation, the aligned bores 26, 39, 40, and 27 are of a size to slidably receive a welding rod 59 when the clamping-member end portion 53 is swung out of crossing relation with respect to the bores 39 and 40, as by manual depression of the button portions 55 against the force of spring 57. Upon release of the button 55, the clamping member will swing into its clamping engagement with the welding rod, as illustrated in Figure 2, to firmly retain the rod in position relative to the holder.

From the foregoing, it is seen that the present invention provides a welding-rod holder which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A welding-rod holder comprising a generally C-shaped handle having its intermediate region adapted to serve as a hand-grip portion, one end region of said handle being formed with a through hole extending generally coplanar with said handle for receiving an electrical-supply conductor, an outward extension on the other end of said handle in general alignment with said hole, a connector block positioned longitudinally of and within said extension, said connector block being adapted at its inner end for connection to the inner end of a conductor extending through said hole, the other end of said connector block being provided with a transverse through bore for slidably receiving a welding rod, and a clamping member mounted in said extension for movement transversely into and out of said bore to releasably clamp a rod in said bore, said handle being formed with an internal passageway in fluid communication with and extending from said connector block entirely through and opening from said hand-grip portion remote from said other end of said handle to provide a passageway for cooling air.

2. A welding-rod holder according to claim 1, said clamping member comprising an elongate element having a transverse intermediate portion in substantial parallelism with said through bore and journaled in said connector block to mount one end portion of said elongate element for swinging movement transversely into and out of said bore to releasably clamp a welding rod in said bore, the other end portion of said elongate element projecting from said extension for manual actuation.

References Cited in the file of this patent
UNITED STATES PATENTS

| 1,240,900 | Symons | Sept. 25, 1917 |
| 1,240,901 | Symons | Sept. 25, 1917 |
| 1,303,230 | Baker | May 13, 1919 |
| 1,450,294 | Jerry | Apr. 3, 1923 |